United States Patent
Bever et al.

(10) Patent No.: US 12,444,771 B2
(45) Date of Patent: Oct. 14, 2025

(54) METHOD AND APPARATUS FOR STACKING BATTERY CELLS

(71) Applicant: Ford Global Technologies, LLC, Dearborn, MI (US)

(72) Inventors: Hannah Bever, South Lyon, MI (US); Andrew William Sherman, Commerce Township, MI (US); Paul John Bojanowski, Macomb Township, MI (US); Christopher Webber, Sterling Heights, MI (US); Carly Chmura, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 631 days.

(21) Appl. No.: 17/667,207

(22) Filed: Feb. 8, 2022

(65) Prior Publication Data

US 2023/0253629 A1    Aug. 10, 2023

(51) Int. Cl.
*H01M 10/0583* (2010.01)
*H01M 10/0525* (2010.01)

(52) U.S. Cl.
CPC ... *H01M 10/0583* (2013.01); *H01M 10/0525* (2013.01)

(58) Field of Classification Search
CPC ............ H01M 10/0583; H01M 10/0525
See application file for complete search history.

(56) References Cited

U.S. PATENT DOCUMENTS

| | | |
|---|---|---|
| 4,479,300 A | 10/1984 | Savage |
| 9,083,007 B2 | 7/2015 | Wu et al. |
| 9,450,268 B2 | 9/2016 | Sato et al. |
| 9,929,393 B2 | 3/2018 | Shiu et al. |
| 10,396,401 B2 | 8/2019 | Yuhara et al. |
| 2010/0015529 A1* | 1/2010 | Kim ................ H01M 10/0413 429/246 |
| 2014/0230239 A1* | 8/2014 | Sato ................ H01M 10/0583 29/730 |
| 2020/0227787 A1 | 7/2020 | Kang et al. |

FOREIGN PATENT DOCUMENTS

| | | | | |
|---|---|---|---|---|
| DE | 102017216188 | | 3/2019 | |
| DE | 102017216213 | | 3/2019 | |
| DE | 102019204868 | | 10/2020 | |
| JP | 2009289418 A | * | 12/2009 | ............ B29C 65/02 |
| WO | WO-2021182406 A1 | * | 9/2021 | ........ H01M 10/0583 |

OTHER PUBLICATIONS

Baumeister, et al., Integrated cut and place module for high productive manufacturing of lithium-ion cells, CIRP Annals—Manufacturing Technology, 2014, pp. 5-8, vol. 63, Elsevier.

* cited by examiner

*Primary Examiner* — George R Koch
(74) *Attorney, Agent, or Firm* — Burris Law, PLLC (57) ABSTRACT

A method for stacking a battery cell includes feeding a separator sheet through a guide assembly to fold the separator sheet, inserting a plurality of first electrodes into the separator sheet at a location where the separator sheet has been folded by the guide assembly, forming respective channels in the folded separator sheet including the plurality of first electrodes, inserting a plurality of second electrodes in the respective channels to form a multilayered body, and pressing the multilayered body to form the stacked battery cell where the plurality of first electrodes and the plurality of second electrodes are stacked in an alternating arrangement.

20 Claims, 11 Drawing Sheets

METHOD AND APPARATUS FOR STACKING BATTERY CELLS

FIELD

The present disclosure relates to a method and apparatus for stacking battery cells.

BACKGROUND

The statements in this section merely provide background information related to the present disclosure and may not constitute prior art.

A second battery such as a lithium ion second battery, for example, comprises positive electrodes, negative electrodes, and a separator. The second battery is formed by superposing the positive electrodes and negative electrodes alternately such that the separator is interposed between the positive electrodes and negative electrodes. There exists a number of methods for manufacturing a second battery such as zigzag stacking and lamination stacking, for example. Such methods for manufacturing a second battery cell can be costly and/or time consuming.

The cost and time related to manufacturing second batteries, among other issues related manufacturing second batteries, are addressed by the present disclosure.

SUMMARY

This section provides a general summary of the disclosure and is not a comprehensive disclosure of its full scope or all of its features.

In one form, the present disclosure provides a method for stacking a battery cell. The method comprises feeding a separator sheet through a guide assembly to fold the separator sheet; inserting a plurality of first electrodes into the separator sheet at a location where the separator sheet has been folded by the guide assembly as the separator sheet is being fed through the guide assembly; forming respective channels in the folded separator sheet comprising the plurality of first electrodes; inserting a plurality of second electrodes in the respective channels to form a multilayered body; and pressing the multilayered body to form the stacked battery cell where the plurality of first electrodes and the plurality of second electrodes are stacked in an alternating arrangement.

In variations of the method for stacking a battery cell of the above paragraph, which may be implemented individually or in any combination: the separator sheet is flat prior to being fed through the guide assembly and is U-shaped after being fed through the guide assembly; the separator sheet is a roll of separator sheet, and a portion of the roll of separator sheet comprising the plurality of first electrodes is cut after a predetermined number of first electrodes have been inserted into the separator sheet at the location where the separator sheet has been folded and before the plurality of second electrodes are inserted into the respective channels; inserting the plurality of first electrodes into the separator sheet comprises inserting the plurality of first electrodes one at a time at the location where the separator sheet has been folded by the guide assembly; the plurality of second electrodes are inserted into the respective channels after the plurality of first electrodes are inserted into the separator sheet at the location where the separator sheet has been folded; holding the plurality of second electrodes in the respective channels formed in the folded separator sheet at a predetermined position as the multilayered body is being pressed; the respective channels are formed in the folded separator sheet prior to the plurality of second electrodes being inserted into respective channels; the respective channels are formed in the folded separator sheet by the plurality of second electrodes; the multilayered body has an accordion shape after the plurality of second electrodes are inserted into the respective channels; the plurality of first electrodes are aligned along a length of the folded separator sheet prior to forming respective channels in the folded separator sheet; and pressing the multilayered body comprises pressing the multilayered body from opposing ends of the multilayered body to form the stacked battery cell.

In another form, the present disclosure provides a method for stacking a battery cell. The method comprises feeding a separator sheet through a guide assembly to fold the separator sheet; inserting a plurality of first electrodes into the separator sheet at a location where the separator sheet has been folded by the guide assembly as the separator sheet is being fed through the guide assembly; forming respective channels in the folded separator sheet comprising the plurality of first electrodes; inserting a plurality of second electrodes in the respective channels to form a multilayered body after the plurality of first electrodes are inserted into the separator sheet at the location where the separator sheet has been folded; holding the plurality of second electrodes in the respective channels formed in the folded separator sheet at a predetermined position; and pressing the multilayered body to form the stacked battery cell where the plurality of first electrodes and the plurality of second electrodes are stacked in an alternating arrangement.

In yet another form, the present disclosure provides a method for stacking a battery cell. The method comprises feeding a separator sheet through a guide assembly to fold the separator sheet; inserting a plurality of first electrodes into the roll of separator sheet at a location where the roll of separator sheet has been folded by the guide assembly as the roll of separator sheet is being fed through the guide assembly; cutting a portion of the roll of separator sheet comprising the plurality of first electrodes after a predetermined number of first electrodes have been inserted into the roll of separator sheet at the location where the separator sheet has been folded; forming respective channels in the folded separator sheet comprising the plurality of first electrodes; inserting a plurality of second electrodes in the respective channels to form a multilayered body after the plurality of first electrodes are inserted into the separator sheet at the location where the separator sheet has been folded; holding the plurality of second electrodes in the respective channels formed in the folded separator sheet at a predetermined position; and pressing the multilayered body to form the stacked battery cell where the plurality of first electrodes and the plurality of second electrodes are stacked in an alternating arrangement.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1-6, an apparatus is provided for manufacturing a stacked battery cell 12 having a plurality of first electrodes 14, a plurality of second electrodes 16, and a folded separator sheet 18 interposed between adjacent first and second electrodes 14, 16. The plurality of first electrodes 14 and the plurality of second electrodes 16 are stacked in an alternating arrangement. Each first electrode 14 is made of a single, separate electrode sheet having opposing ends. Each first electrode 14 also comprises a foil tab 20 extending from at least one of the opposing ends. Each second electrode 16 is made of a single, separate electrode sheet having opposing ends. Each second electrode 16 also comprises a foil tab 22 extending from at least one of the opposing ends. The foil tabs 20 of the first electrodes 14 may be bundled to each other and connected to a first electrode terminal (not shown). Similarly, the foil tabs 22 of the second electrodes 16 may be bundled to each other and connected to a second electrode terminal (not shown).

The apparatus for manufacturing the stacked battery cell 12 comprises a first guide assembly 24, an electrode supply device 26, a second guide assembly 28, a pair of side plates 30a, 30b, a pair of raking devices 31 (FIG. 5b), a pair of support rails 32, and a pair of pressing devices 33a, 33b.

Figure 1:
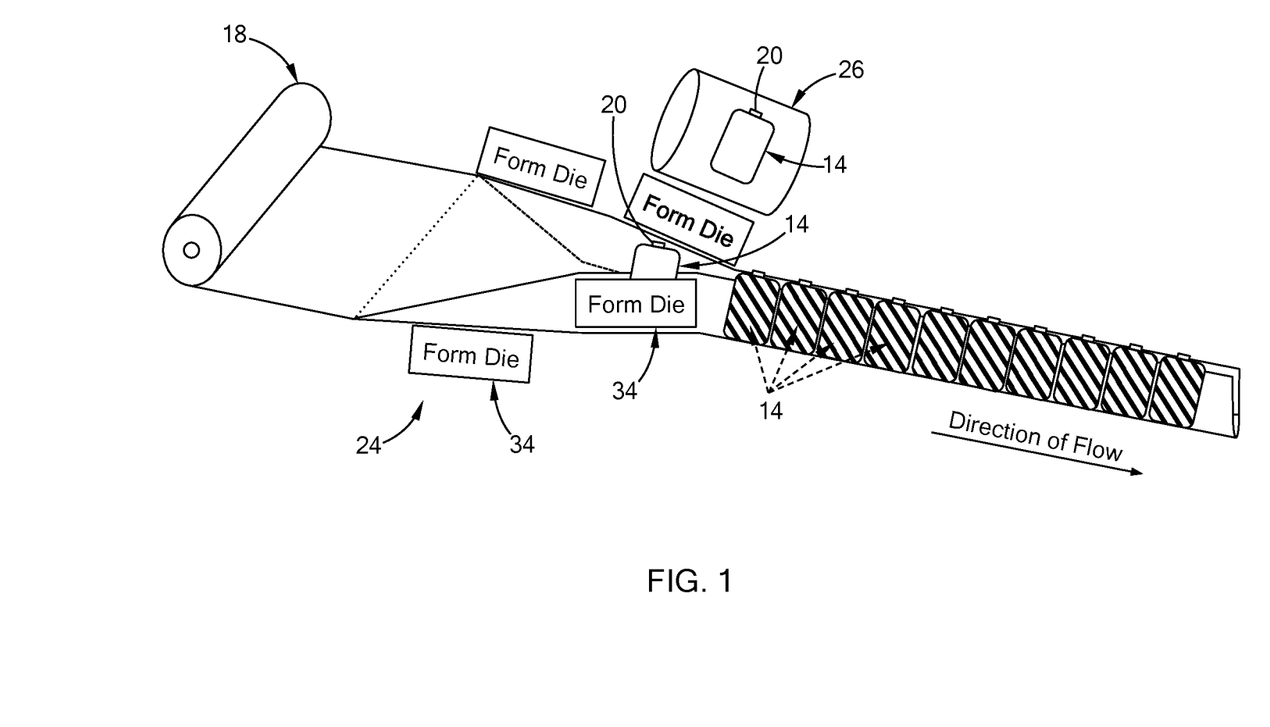
FIG. 1 is a schematic view of a first guide assembly and an electrode supply device of an apparatus for manufacturing a stacked battery cell according to the principles of the present disclosure with a second guide assembly of the apparatus removed for clarity.

With reference to FIG. 1, the first guide assembly 24 comprises a plurality of pairs of opposing forming dies 34 arranged in series. Each pair of opposing forming dies 34 is configured to gradually fold a roll of separator sheet 18. That is, the roll of separator sheet 18 is flat prior to being fed through the first guide assembly 24 and is U-shaped or V-shaped after being fed through the first guide assembly 24.

Figure 2:
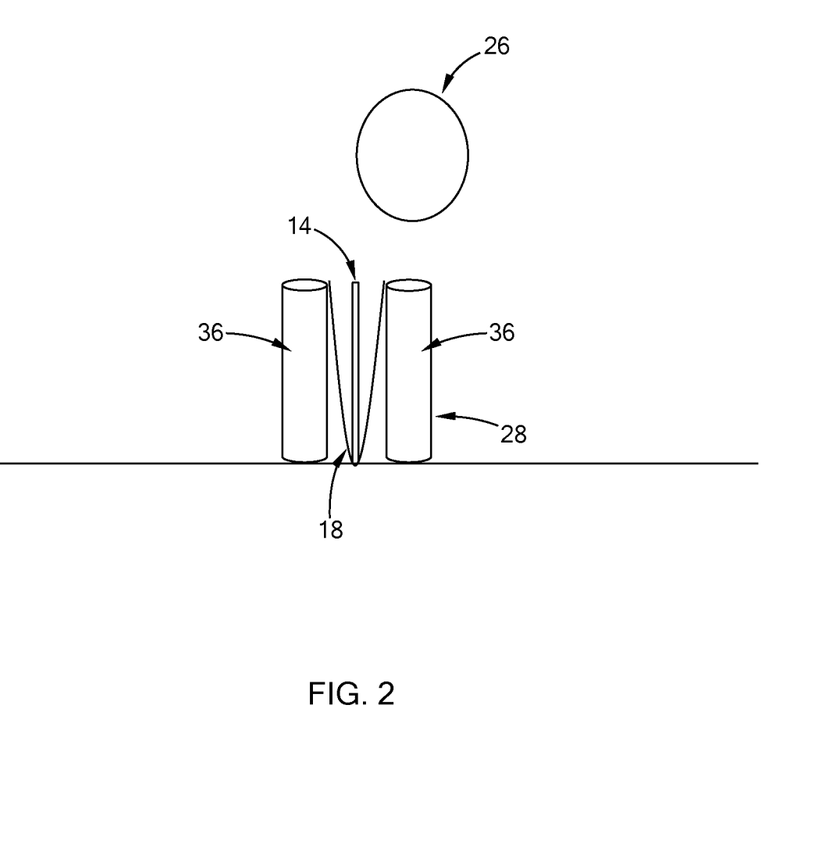
FIG. 2 is a schematic end view of the apparatus of FIG. 1 showing a second guide assembly and a folded separator sheet comprising first electrodes.

With reference to FIGS. 1 and 2, the electrode supply device 26 is configured to insert the plurality of first electrodes 14 into the separator sheet 18 at a location where the separator sheet 18 has been folded by the first guide assembly 24 as the separator sheet 18 is being fed through the first guide assembly 24 (i.e., the separator sheet 18 continues to be fed through the first guide assembly 24 as the first electrodes 14 are being inserted into the separator sheet 18). It should be understood that the electrode supply device 26 inserts the first electrodes 14 into the separator sheet 18 one at a time at the location where the separator sheet 18 has been folded by the first guide assembly 24. In this way, the first electrodes 14 are sandwiched between the folded separator sheet 18. The first electrodes 14 are also positioned within the separator sheet 18 at predetermined intervals. In the example illustrated, the electrode supply device 26 is a rotary drum that is configured to pick-up a respective first electrode 14 from a feed station (not shown) via vacuum suction, for example, and release the respective first electrode 14 into the separator sheet 18 at the location where the separator sheet 18 has been folded. In other examples, the electrode supply device 26 may be a gripper or any other suitable device that can pick-up a respective first electrode 14 and release the respective first electrode into the separator sheet 18.

With reference to FIG. 2, the second guide assembly 28 is located downstream of the first guide assembly 24 and comprises a plurality of pairs of opposing rollers 36 arranged in series (only one pair of opposing rollers 36 are shown in FIG. 2). Each pair of opposing rollers 36 is configured to act as clamps to keep the first electrodes 14 sandwiched between the folded separator sheet 18. Each pair of opposing rollers 36 is also configured to move the folded separator sheet 18 comprising the first electrodes 14 in a forward direction until a desired number of first electrodes 14 are inserted into the folded separator sheet 18.

Figure 4:
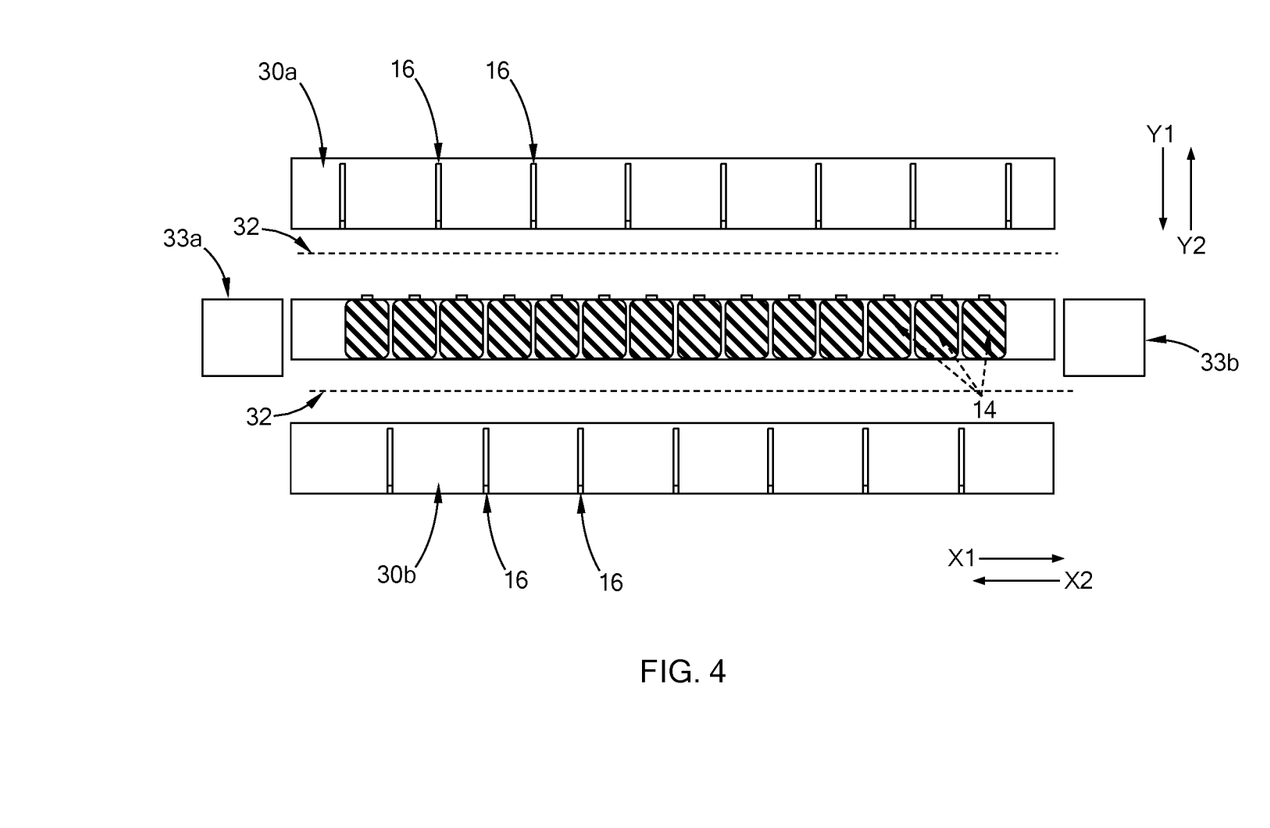
FIG. 4 is a schematic view of side plates of the apparatus of FIG. 1 comprising second electrodes, the side plates positioned on opposing sides of the folded separator sheet of FIG. 3 in a retraced position.
Figure 5A:
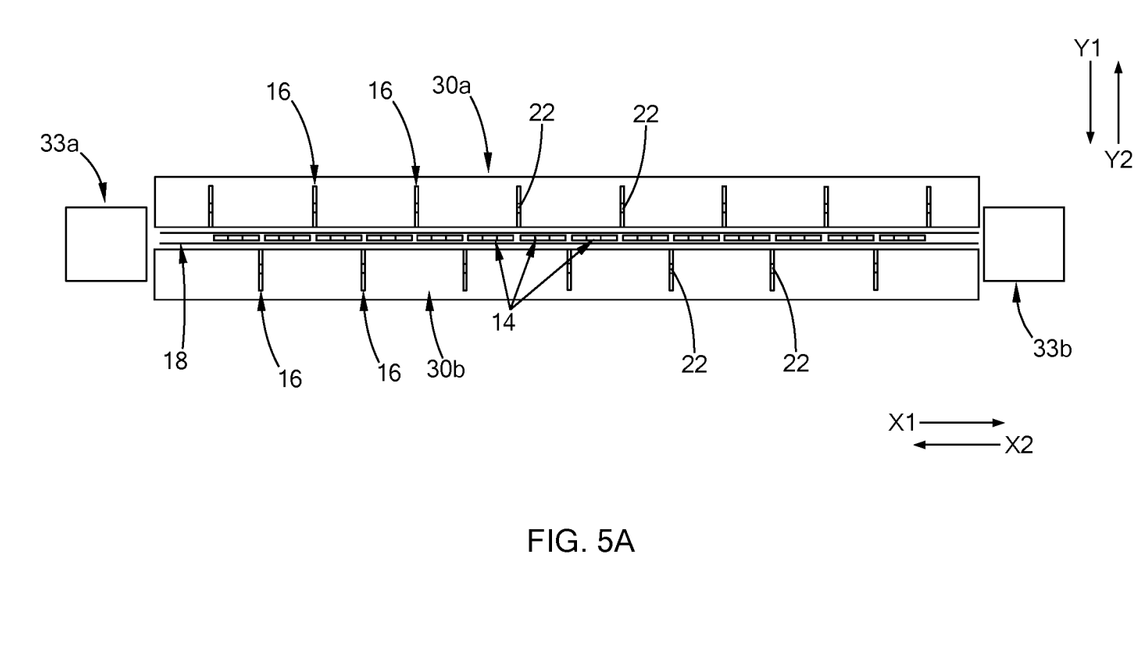
FIG. 5a is a top view of the side plates of the apparatus of FIG. 1 positioned on opposing sides of the folded separator sheet of FIG. 3 in a deployed position.
Figure 5B:
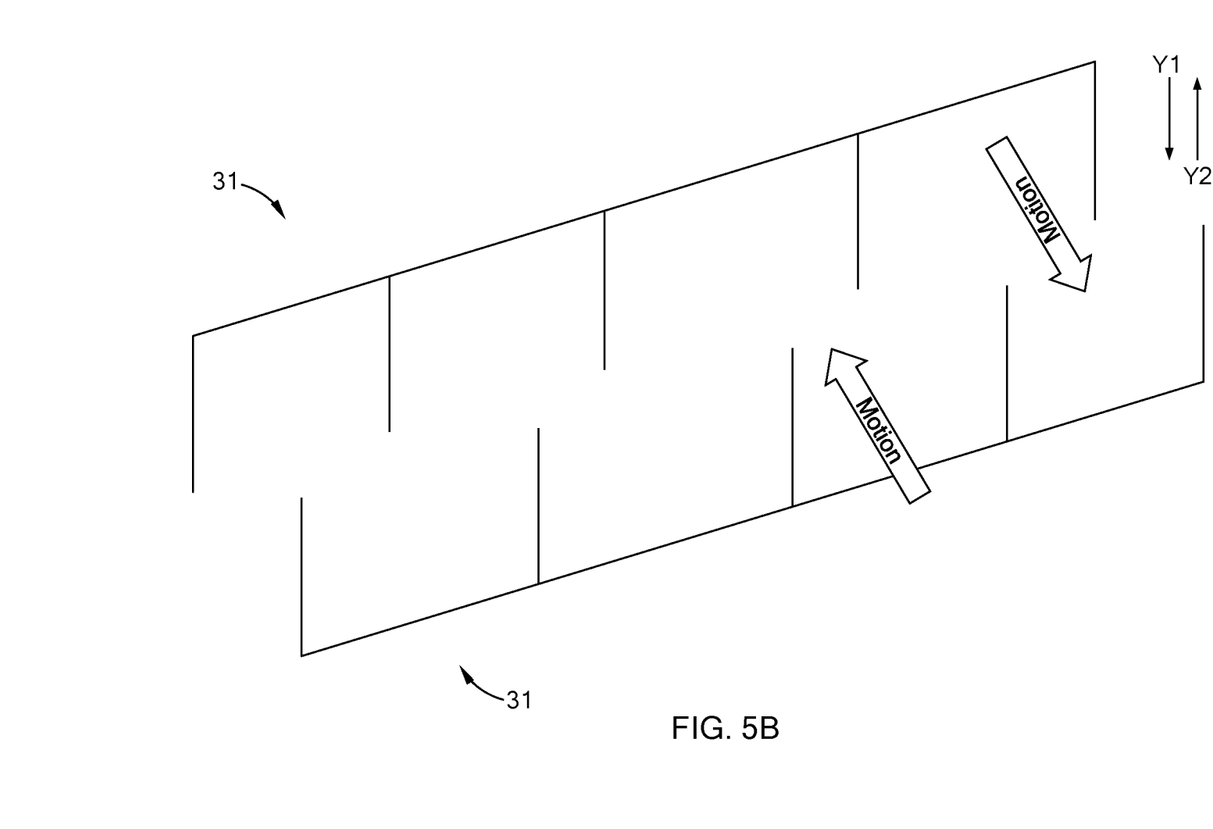
FIG. 5b is a perspective view of a pair of raking devices of the apparatus of FIG. 1.
Figure 6:
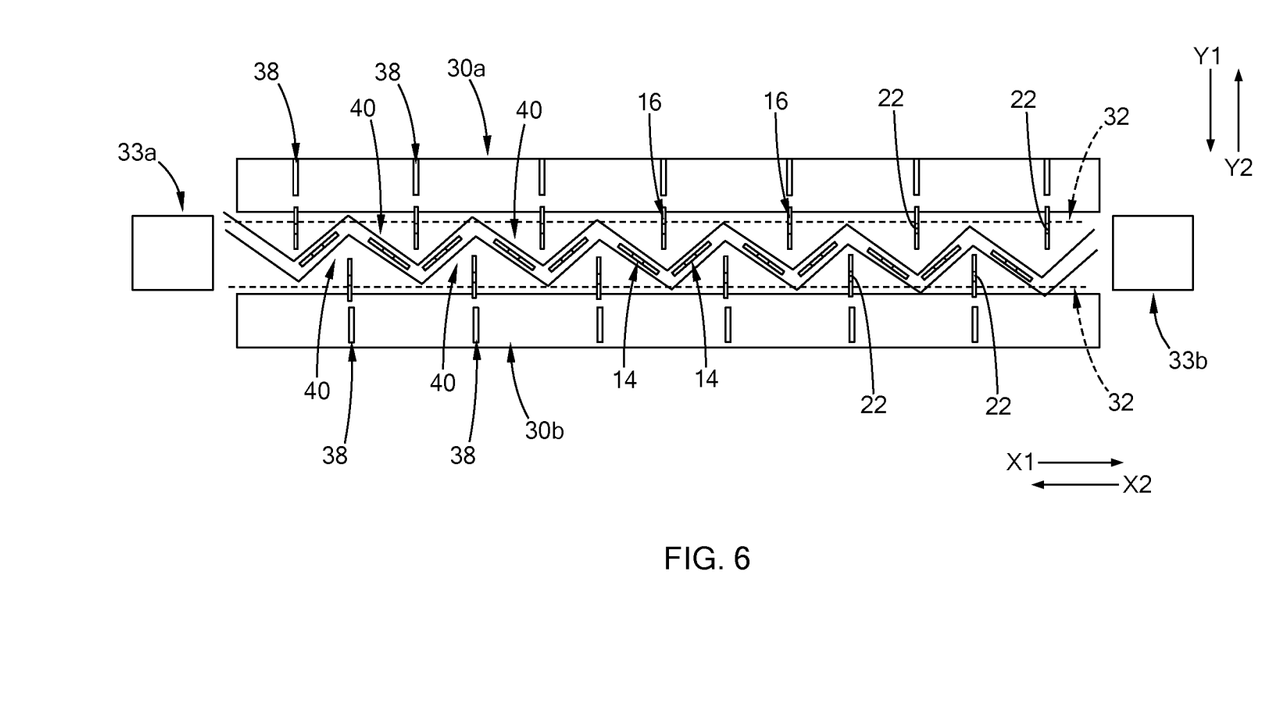
FIG. 6 is a top view of the side plates of the apparatus of FIG. 1 being moved from the deployed position to the retraced position as the second electrodes are inserted into channels formed in the folded separator sheet.
Figure 7:
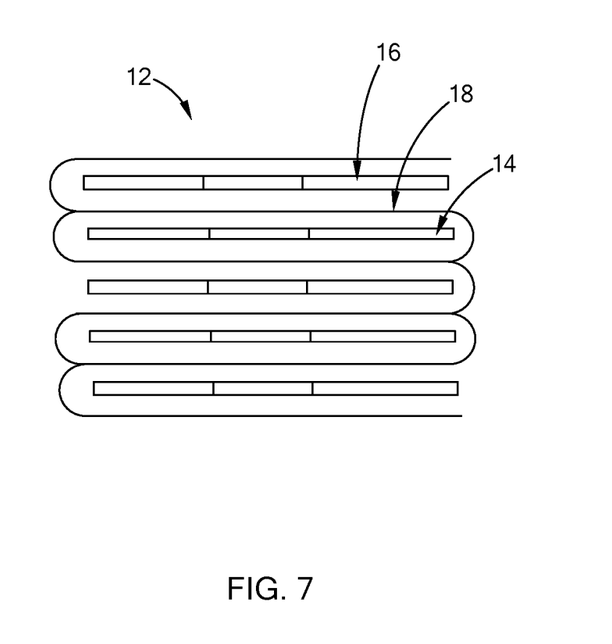
FIG. 7 is a top view of the stacked battery cell.

With reference to FIGS. 4-6, the pair of side plates 30a, 30b are positioned on opposing sides of the folded separator sheet 18 comprising the desired number of first electrodes 14. One side plate 30a of the pair of side plates 30a, 30b is configured to be driven in a first lateral direction Y1 toward the folded separator sheet 18 and a second lateral direction Y2 away from the folded separator sheet 18. The other side plate 30b of the pair of side plates 30a, 30b is configured to be driven in the second lateral direction Y2 toward the folded separator sheet 18 and the first lateral direction Y1 away from the folded separator sheet 18. In one example, each side plate 30a, 30b is driven by a respective drive unit (not shown). In another example, one drive unit may drive both the side plates 30a, 30b. Each side plate 30a, 30b comprises a plurality of slots 38 (FIG. 6) spaced apart along a length of the side plate 30a, 30b. The plurality of second electrodes 16 are disposed within the slots 38.

Each raking device 31 is configured to form respective channels 40 in the folded separator sheet 18 comprising the desired number of first electrodes 14. In this way, the folded separator sheet 18 has an accordion shape (FIG. 6). Each raking device 31 is also configured to rake the second electrodes 16 from the slots 38 of a respective side plate 30 into channels 40 in the folded separator sheet 18 thereby forming a multilayered body (i.e., folded separator sheet 18 comprising the desired number of first and second electrodes 14, 16). In some configurations, the channels 40 are formed in the folded separator sheet 18 by raking the second electrodes 16 into the folded separator sheet 18 (i.e., the second electrodes 16 form the channels 40 in the folded separator sheet 18).

With reference to FIGS. 4 and 6, the pair of support rails 32 are positioned below the side plates 30 and the folded separator sheet 18 comprising the desired number of first and second electrodes 14, 16. The pair of support rails 32 are configured to be driven in a vertical upward direction toward the folded separator sheet 18 and a vertical downward direction away from the folded separator sheet 18. In one example, each support rail 32 is driven by a respective drive unit (not shown). In another example, one drive unit may drive both the support rails 32. After the second electrodes 16 are raked into the channels 40 of the folded separator sheet 18 by the raking devices 31, the support rails 32 are driven in the vertical upward direction to engage and hold the second electrodes 16 in the respective channels 40 at a predetermined position. In some forms, the pair of support rails 32 may be driven in the vertical upward direction as the second electrodes are raked into the channels 40.

With reference to FIGS. 4-6, the pair of pressing devices 33*a*, 33*b* are positioned at opposing ends of the multilayered body. One pressing device 33*a* of the pair of pressing devices 33*a*, 33*b* is configured to be driven in a forward direction X1 toward the multilayered body and in a backward direction X2 away from the multilayered body. The other pressing device 33*b* of the pair of pressing devices 33*a*, 33*b* is configured to be driven in the backward direction X2 toward the multilayered body and in the forward direction away from the multilayered body. In one example, each pressing device 33*a*, 33*b* is driven by a respective drive unit (not shown). In another example, one drive unit may drive both the pressing devices 33*a*, 33*b*. A controller (not shown) may control the drive units of the pressing devices 33*a*, 33*b*, the support rails 32, and the side plates 30*a*, 30*b*. The pair of pressing devices 33*a*, 33*b* are configured to compress the multilayered body from both ends to form the stacked battery cell 12 where the first electrodes 14 and the second electrodes 16 are stacked in an alternating arrangement. In another example, a stop member (not shown) may be positioned at one end of the multilayered body and a pressing device positioned at the other end of the multilayered body. In such example, the pressing device is driven toward the multilayered body to compress the multilayered body against the stop member to form the stacked battery cell 12.

Figure 3:
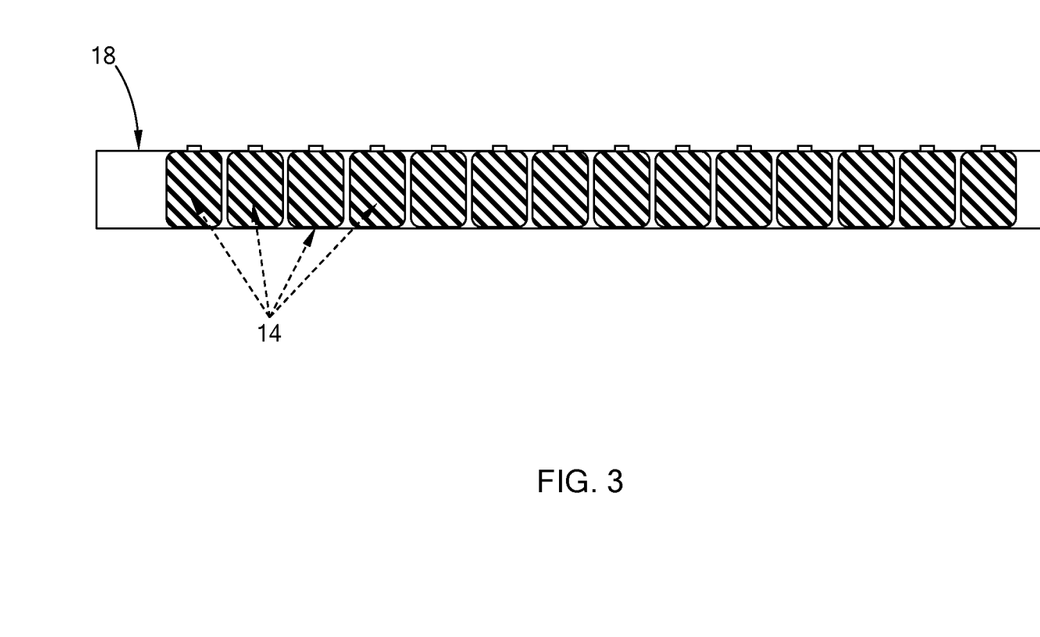
FIG. 3 is a side view of the folded separator sheet comprising a desired number of the first electrodes.
Figure 8:
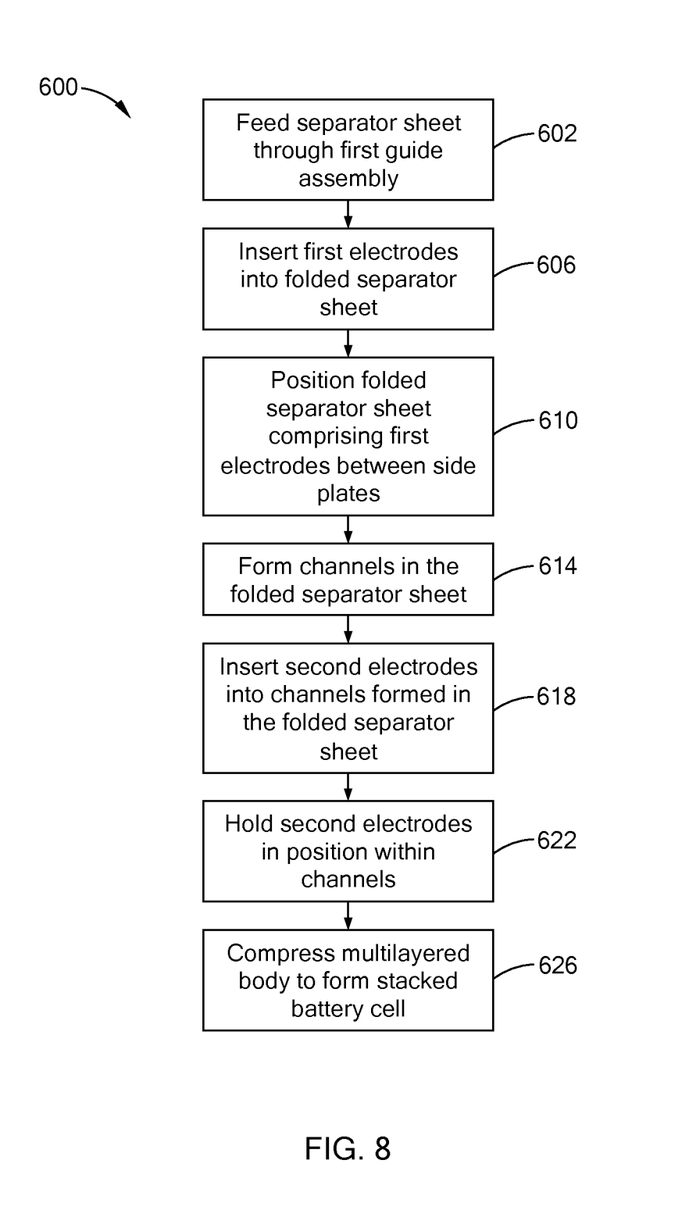
FIG. 8 is a flow chart illustrating a method for stacking a battery cell in accordance with the teachings of the present disclosure.

With continued reference to FIG. 8, a method 600 for manufacturing a stacked battery cell 12 will be described in detail. First, at 602, the roll of separator sheet 18 is fed through the first guide assembly 24 to fold the separator sheet 18. Then, at 606, the first electrodes 14 are inserted into the separator sheet 18 by the electrode supply device 26 at the location where the separator sheet 18 has been folded as the separator sheet 18 is being fed through the first guide assembly 24. In the example illustrated, as shown in FIG. 3, once the desired number of first electrodes 14 are inserted into the separator sheet 18, the portion of the folded separator sheet 18 comprising the desired number of first electrodes 14 is cut by a cutting device (not shown).

Then, at 610, the portion of the folded separator sheet 18 comprising the desired number of first electrodes 14 is positioned between the pair of side plates 30*a*, 30*b* comprising the second electrodes 16. Then, at 614, respective channels 40 are formed in the folded separator sheet 18 comprising the desired number of first electrodes 14. Then, at 618, the second electrodes 16 are inserted into the respective channels 40 from both sides of the folded separator sheet 18 by the raking devices 31 to form the multilayered body. The multilayered body has an accordion shape.

Then, at 622, the second electrodes 16 are held in a predetermined position within the respective channels 40 by the support rails 32. Lastly, at 626, the multilayered body is compressed by the pressing devices 33*a*, 33*b* to form the stacked battery cell 12 where the first electrodes 14 and the second electrodes 16 are stacked in an alternating arrangement and where the folded separator sheet 18 is interposed between adjacent first and second electrodes 14, 16.

The first electrodes 14 described above are negative electrodes and the second electrodes 16 described above are positive electrodes. However, it should be understood that the first electrodes 14 may be positive electrodes and the second electrodes 16 may be negative electrodes without departing from the scope of the present disclosure.

Figure 9:
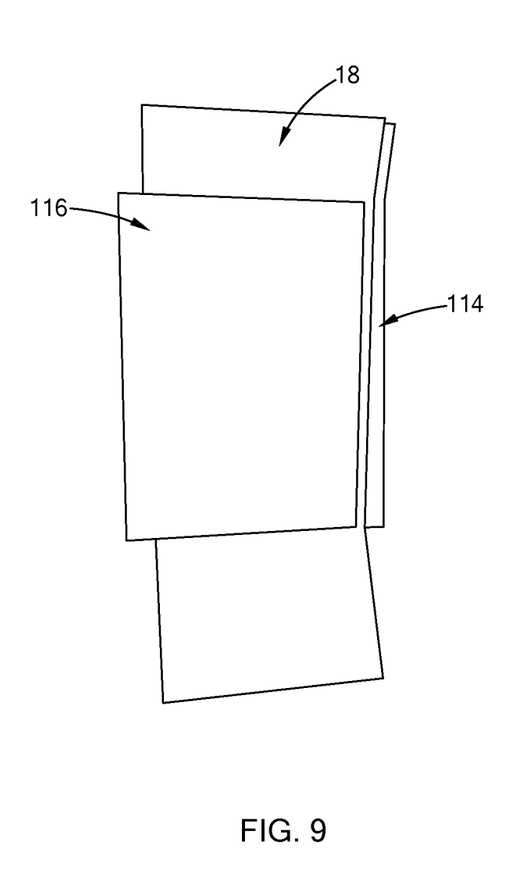
FIG. 9 is a top view of a pre-folded stacked battery cell according to another form, the pre-folded stacked batter cell comprising a single, elongated first electrode sandwiched between a folded separator sheet and a single, elongated second electrode positioned on the folded separator sheet.
Figure 10:
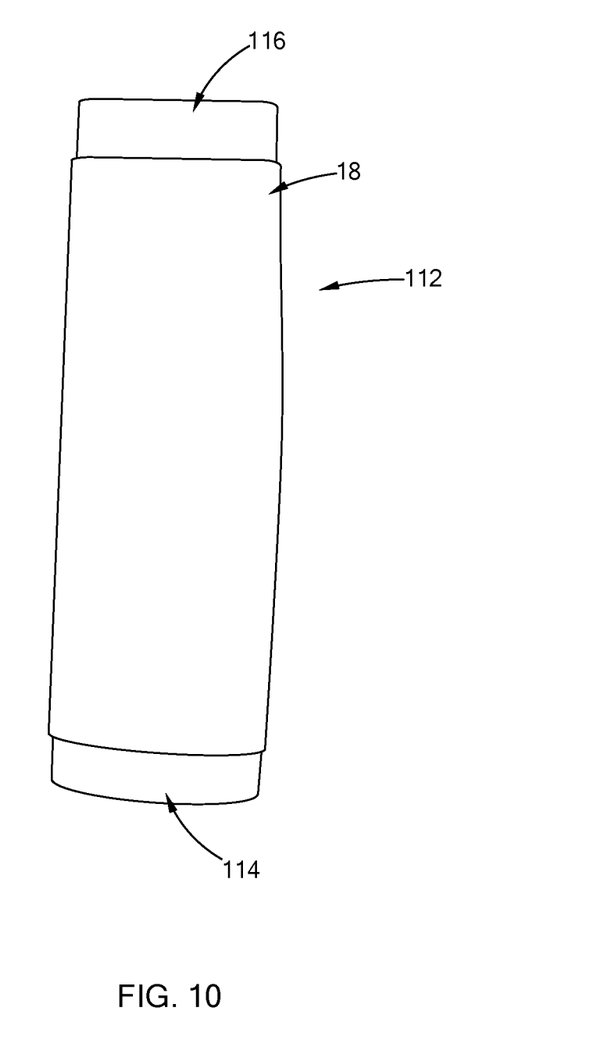
FIG. 10 is a top view of the stacked battery cell of FIG. 9 after being folded.

In another example, as shown in FIGS. 9 and 10, a stacked battery cell 112 may be manufactured using a single, elongated first electrode 114 and a single, elongated second electrode 116 instead of the first electrodes 14 and the second electrodes 16 described above. That is, the electrode supply device 26 may insert the single, elongated first electrode 114 into the folded separator sheet 18 as the separator sheet 18 is being fed through the first guide assembly 24 such that the single, elongated first electrode 114 is sandwiched between the folded separator sheet 18. Then, the single, elongated second electrode 116 is positioned on the folded separator sheet 18 to form a multilayered body (i.e., the multilayered body comprises the folded separator sheet 18 comprising the single, elongated first and second electrodes 114, 116). Lastly, the multilayered body is folded along the length to form the stacked battery cell 112.

The method and apparatus described in the present disclosure can be used for lithium-ion battery pouch cells, prismatic cells, wound cells, uni-polar or bi-polar cells, and solid state batteries, for example. The method and apparatus of the present disclosure provides the benefit of reducing manufacturing time of the stacked battery cell 12.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for stacking a battery cell comprising:
   feeding a separator sheet through a guide assembly to fold the separator sheet;
   inserting a plurality of first electrodes into the separator sheet at a location where the separator sheet has been folded by the guide assembly as the separator sheet is being fed through the guide assembly, the separator sheet folded prior to the insertion of the plurality of first electrodes, the plurality of first electrodes are continuously inserted one at a time into the same location of the folded separator sheet;
   forming respective channels in the folded separator sheet comprising the plurality of first electrodes;
   inserting a plurality of second electrodes in the respective channels to form a multilayered body; and
   pressing the multilayered body to form the stacked battery cell where the plurality of first electrodes and the plurality of second electrodes are stacked in an alternating arrangement.

2. The method of claim 1, wherein the separator sheet is flat prior to being fed through the guide assembly and is U-shaped after being fed through the guide assembly.

3. The method of claim 1, wherein the separator sheet is a roll of separator sheet, and wherein a portion of the roll of separator sheet comprising the plurality of first electrodes is cut after a predetermined number of first electrodes have been inserted into the separator sheet at the location where the separator sheet has been folded and before the plurality of second electrodes are inserted into the respective channels.

4. The method of claim 1, wherein inserting the plurality of first electrodes into the separator sheet comprises inserting the plurality of first electrodes one at a time at the location where the separator sheet has been folded by the guide assembly.

5. The method of claim 1, wherein the plurality of second electrodes are inserted into the respective channels after the plurality of first electrodes are inserted into the separator sheet at the location where the separator sheet has been folded.

6. The method of claim 1, further comprising holding the plurality of second electrodes in the respective channels formed in the folded separator sheet at a predetermined position as the multilayered body is being pressed.

7. The method of claim 1, wherein the respective channels are formed in the folded separator sheet prior to the plurality of second electrodes being inserted into respective channels.

8. The method of claim 1, wherein the respective channels are formed in the folded separator sheet by the plurality of second electrodes.

9. The method of claim 1, wherein the multilayered body has an accordion shape after the plurality of second electrodes are inserted into the respective channels.

10. The method of claim 1, wherein the plurality of first electrodes are aligned along a length of the folded separator sheet prior to forming respective channels in the folded separator sheet.

11. The method of claim 1, wherein pressing the multilayered body comprises pressing the multilayered body from opposing ends of the multilayered body to form the stacked battery cell.

12. A method for stacking a battery cell comprising:
    feeding a separator sheet through a guide assembly to fold the separator sheet;
    inserting a plurality of first electrodes into the separator sheet at a location where the separator sheet has been folded by the guide assembly as the separator sheet is being fed through the guide assembly, the separator sheet folded prior to the insertion of the plurality of first electrodes, the plurality of first electrodes are continuously inserted one at a time into the same location of the folded separator sheet;
    forming respective channels in the folded separator sheet comprising the plurality of first electrodes;
    inserting a plurality of second electrodes in the respective channels to form a multilayered body after the plurality of first electrodes are inserted into the separator sheet at the location where the separator sheet has been folded;
    holding the plurality of second electrodes in the respective channels formed in the folded separator sheet at a predetermined position; and
    pressing the multilayered body to form the stacked battery cell where the plurality of first electrodes and the plurality of second electrodes are stacked in an alternating arrangement.

13. The method of claim 12, wherein the separator sheet is flat prior to being fed through the guide assembly and is U-shaped after being fed through the guide assembly.

14. The method of claim 12, wherein inserting the plurality of second electrodes in the respective channels to form a multilayered body comprises inserting the plurality of second electrodes in the respective channels from both sides of the folded separator sheet.

15. The method of claim 12, wherein inserting the plurality of first electrodes into the separator sheet comprises inserting the plurality of first electrodes one at a time at the location where the separator sheet has been folded by the guide assembly.

16. The method of claim 12, wherein the multilayered body has an accordion shape after the plurality of second electrodes are inserted into the respective channels.

17. The method of claim 12, wherein pressing the multilayered body comprises pressing the multilayered body from one end of the multilayered body to form the stacked battery cell.

18. A method for stacking a battery cell comprising:
feeding a roll of separator sheet through a guide assembly to fold the roll of separator sheet;
inserting a plurality of first electrodes into the roll of separator sheet at a location where the roll of separator sheet has been folded by the guide assembly as the roll of separator sheet is being fed through the guide assembly, the roll of separator sheet folded prior to the insertion of the plurality of first electrodes, the plurality of first electrodes are continuously inserted one at a time into the same location of the folded separator sheet;
cutting a portion of the roll of separator sheet comprising the plurality of first electrodes after a predetermined number of first electrodes have been inserted into the roll of separator sheet at the location where the separator sheet has been folded;
forming respective channels in the folded separator sheet comprising the plurality of first electrodes;
inserting a plurality of second electrodes in the respective channels to form a multilayered body after the plurality of first electrodes are inserted into the roll of separator sheet at the location where the separator sheet has been folded;
holding the plurality of second electrodes in the respective channels formed in the folded separator sheet at a predetermined position; and
pressing the multilayered body to form the stacked battery cell where the plurality of first electrodes and the plurality of second electrodes are stacked in an alternating arrangement.

19. The method of claim 18, wherein the roll of separator sheet is flat prior to being fed through the guide assembly and is U-shaped after being fed through the guide assembly.

20. The method of claim 18, wherein the multilayered body has an accordion shape after the plurality of second electrodes are inserted into the respective channels.

* * * * *